United States Patent
Long

(10) Patent No.: US 11,282,406 B2
(45) Date of Patent: Mar. 22, 2022

(54) SAFETY AND TRAINING APPARATUS AND A METHOD THEREOF

(71) Applicant: Jeffrie Eugene Long, Huntingtown, MD (US)

(72) Inventor: Jeffrie Eugene Long, Huntingtown, MD (US)

(*) Notice: Subject to any disclaimer, the term of this patent is extended or adjusted under 35 U.S.C. 154(b) by 0 days.

(21) Appl. No.: 17/115,517

(22) Filed: Dec. 8, 2020

(65) Prior Publication Data
US 2021/0090455 A1    Mar. 25, 2021

Related U.S. Application Data

(60) Provisional application No. 62/972,390, filed on Feb. 10, 2020.

(51) Int. Cl.
| | | |
|---|---|---|
| *G09B 19/00* | (2006.01) | |
| *G09B 9/00* | (2006.01) | |
| *A63B 69/00* | (2006.01) | |

(52) U.S. Cl.
CPC ............ *G09B 9/00* (2013.01); *A63B 69/0053* (2013.01); *G09B 19/00* (2013.01)

(58) Field of Classification Search
CPC ...... G09B 19/00; A63B 69/0053; G08B 21/02
See application file for complete search history.

(56) References Cited

U.S. PATENT DOCUMENTS 5,092,816 A * 3/1992 Levasseur ............... G07F 5/24
                                                         453/17
9,972,187 B1 * 5/2018 Srinivasan ......... G08B 21/0492
(Continued)

OTHER PUBLICATIONS

Palakkandy, et al. "Accurate measurement of the position and velocity of falling object". American Journal of Physics 75(3):254-258. Mar. 2007 (Year: 2007).*

*Primary Examiner* — Robert J Utama
(74) *Attorney, Agent, or Firm* — Barry Choobin; Patent 360

(57) ABSTRACT

The present invention is directed to an apparatus for demonstrating in a simulated reality of a person's reaction and response time to an object dropped from an elevated working platform even when the person is notified the moment the object is dropped. The apparatus comprising an elongated hollow pipe having a proximal end and a distal end, the proximal end having a proximal end opening, the distal end having a distal end opening, the proximal end coupled to a second level of a multilevel platform, the distal end coupled to a first level of the multilevel platform, wherein the second level is above the first level; a second sensor coupled to the distal end of the elongated hollow pipe, the second sensor configured to detect an object received from the proximal end opening and descending within the elongated hollow pipe and reach the second sensor; a mat having a third sensor, the mat positioned at the first level, the third sensor configured to detect presence of a person over the mat; an alarm; and a control unit electrically connected to the second sensor, the third sensor, and the alarm, wherein the control unit is configured to receive a second signal from the second sensor, the second signal indicate the object reaching the second sensor, determine presence of the person over the mat when the second signal is received by the control unit, and trigger the alarm in response to the presence of the person.

16 Claims, 4 Drawing Sheets

(56) References Cited

U.S. PATENT DOCUMENTS

| | | | |
|---|---|---|---|
| 2002/0156634 A1* | 10/2002 | Blum | A47L 13/29 704/270 |
| 2013/0054017 A1* | 2/2013 | Horev | G06M 7/00 700/240 |
| 2013/0286197 A1* | 10/2013 | Lee | G08B 21/02 348/142 |
| 2015/0228177 A1* | 8/2015 | Yi | G01P 15/036 340/573.1 |
| 2020/0258364 A1* | 8/2020 | Quilici | G01S 17/58 |

* cited by examiner ial patent application Ser. No. 62/972,390 filed on Feb. 10, 2020, which is incorporated herein by reference in its entirety.

FIELD OF INVENTION

The present invention relates to an apparatus and method for worker's safety in a multi-level work site.

BACKGROUND

Generally, in multi-level work sites, work is simultaneously undertaken at more than one level. Workers engaged in different jobs work at distinct levels of the multi-level work site at the same time. In high rise construction, such as a multistory building, workers at the same time are working at various levels or stories of the multistory building.

In multi-level work sites, there are always chances of injuries by objects fallen from the upper level to the lower level. The object can fall due to the nature of the work being conducted or it can be accidental also. Such objects can include construction materials, tools, equipment, and like. For example, a worker may accidentally drop his screwdriver or hammer. In construction works, stones and boulders can become loosen and fall. The fallen object may hit a worker working at a lower level. Injuries caused by such fallen objects can be fatal and life-threatening. Thus, the safety of the workers in multi-level work sites has become a paramount concern.

Although the risk of falling object in multi-level work sites is inevitable, therefore precautions are generally undertaken to safeguard the workers from the falling objects. For example, workers must wear hard hat or helmets at the work sites. Netting and temporary structures are deployed to capture the fallen objects. Tool lanyard and tether are used to secure tools to a fix point on the elevated work area. Also, barricades are used to protect the workers on lower level from entering in the area of the falling objects. However, such precautionary measures are not always feasible at all the worksites or portions of the work sites. Thus, it is important for the workers working at the multi-level sites to be attentive at all the times while working.

A need is therefore appreciated for an apparatus that allows improving the attention of the workers and evaluate the reaction time to alerts. The need is appreciated for an apparatus that can promote the use of safeguard and train workers how to prevent falling objects. Such an apparatus could be used at multilevel work sites.

SUMMARY OF THE INVENTION

The principal object of the present invention is therefore directed to an apparatus and method for training workers at a multi-level work site.

It is a further object of the present invention that the apparatus and method improve the attention of the workers.

It is an additional object of the present invention that the apparatus and method can evaluate the reaction time of the workers.

It is still an additional object of the present invention that the apparatus and method reduce the accidents due to fallen objects in a multi-level work site.

It is yet an additional object of the present invention that the apparatus is economical to manufacture.

It is another object of the present invention that the apparatus can be easily assembled at a work site.

In one aspect, the present invention is directed to an apparatus for training workers at a multi-level work site. The apparatus according to the present invention demonstrates, in a simulated reality, a person's reaction and response time to an object dropped from an elevated working platform even when the person is notified the moment the object is dropped. The apparatus comprises an elongated hollow pipe having a proximal end and a distal end. The proximal end of the hollow pipe is having a first sensor that can detect the entry of an object into the hollow pipe. The distal end of the elongated hollow pipe also comprises a second sensor that can detect an exit of the object from the elongated hollow pipe. The apparatus further comprises a mat having a third sensor. The mat is of a dimension to accommodate a worker in both the sitting and standing position. The third sensor, incorporated into the mat, can sense if a person is present on the mat. The apparatus further comprises a strobe light buzzer. A control unit electrically connecting the first sensor, the second sensor, the third sensor, and the strobe light buzzer.

In one aspect, the control unit can receive a first signal from the first sensor and a second signal from the second sensor, wherein the first signal indicates the entry of an object, and the second signal indicates the exit of the object from the elongated hollow pipe. At the same time, the control unit can also receive a signal from the third sensor which indicates the presence of a person on the mat. The control unit can trigger the strobe light buzzer if a person is present on the mat when the object exits from the elongated hollow pipe.

In one aspect, the elongated hollow pipe can be positioned between a first level and second level of a multilevel platform, wherein the second level is above the first level. The proximal end of the elongated hollow pipe can be coupled to the second level and the distal end can be coupled to the first level of the multilevel platform. The proximal end of the elongated hollow pipe having a proximal end opening and the distal end having a distal end opening. An object can be received into the elongated hollow pipe from the proximal end opening, wherein the object falls under gravity towards the distal end. While the object is dropped into the elongated hollow pipe, a command can be issued to a worker positioned over the mat deployed on the first level. In one case, the command can be an audio command, such as "object fall" or "getaway". The command can be issued just before the object is drop, while dropping the object, or just after the object is drop. In one case, the object can be a ball.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
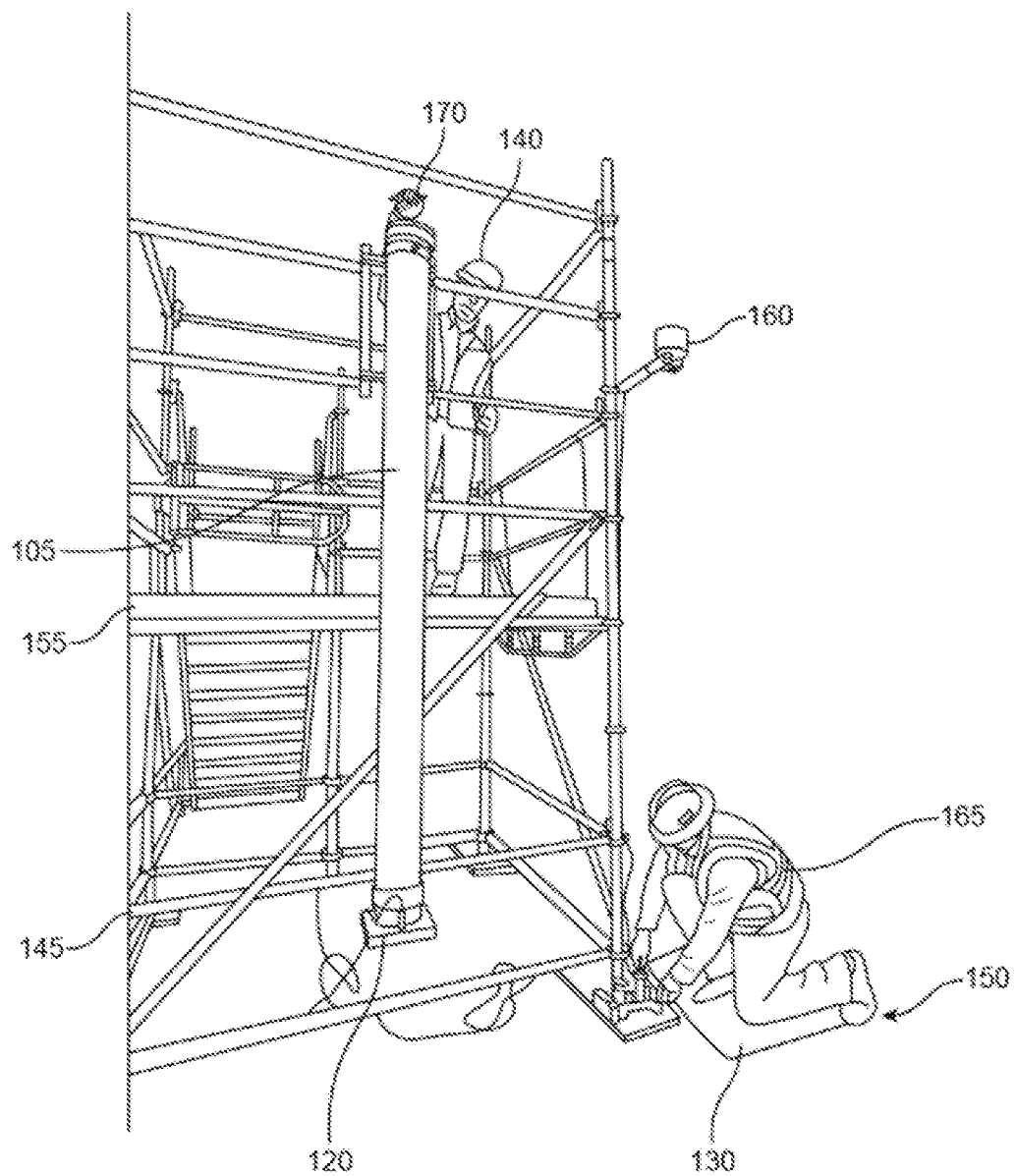
FIG. 1 shows the apparatus coupled to a multi-level platform, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Figure 2:
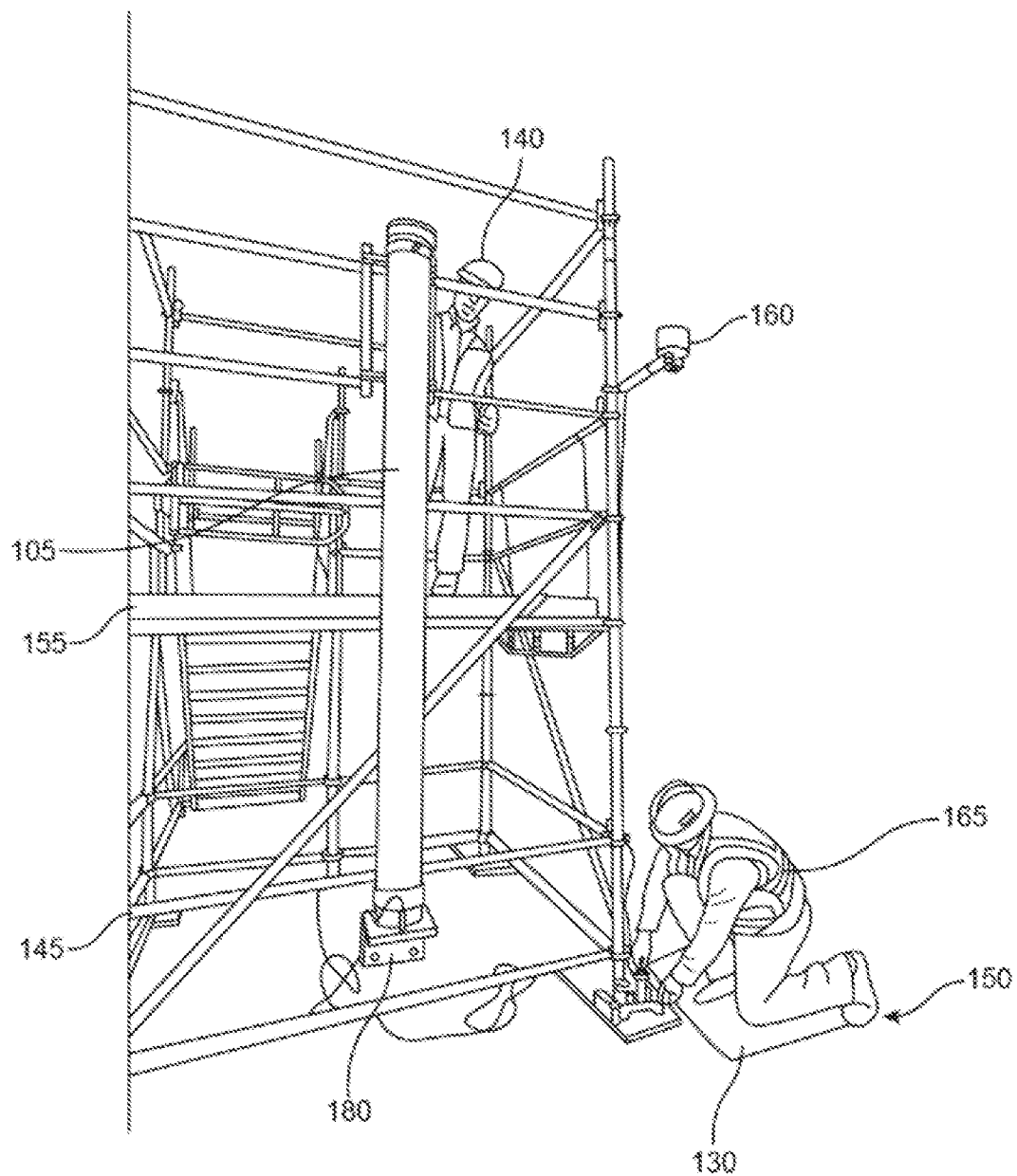
FIG. 2 shows the apparatus of FIG. 1 having the flap in open position, according to an exemplary embodiment of the present invention.

The present invention is directed to an apparatus that can demonstrate in a simulated reality of a person's reaction and response time to an object dropped from an elevated working platform even when the person is notified the moment the object is dropped. The present invention is advantageous by promoting an initiative-taking approach to implement prevented methods to eliminate struck by fallen object injuries or deaths. Now referring to FIGS. 1 and 2 which show an exemplary embodiment of the multilevel worksite having a first level and a second level. The first level 150 is below the second level 155, wherein FIGS. 1 and 2 show a first-person 165 working on the first level 150, and a second person 140 is working on the second level 155. FIGS. 1 and 2 illustrate the second person 140 working above the first person 165 and there could be danger of a fallen object accidentally dropped from the second person 140 that can hit the first person 165 working below the second person 140. The fallen object can be a tool with which the second person is working. The tool, for example, can be a screwdriver.

Figure 3:
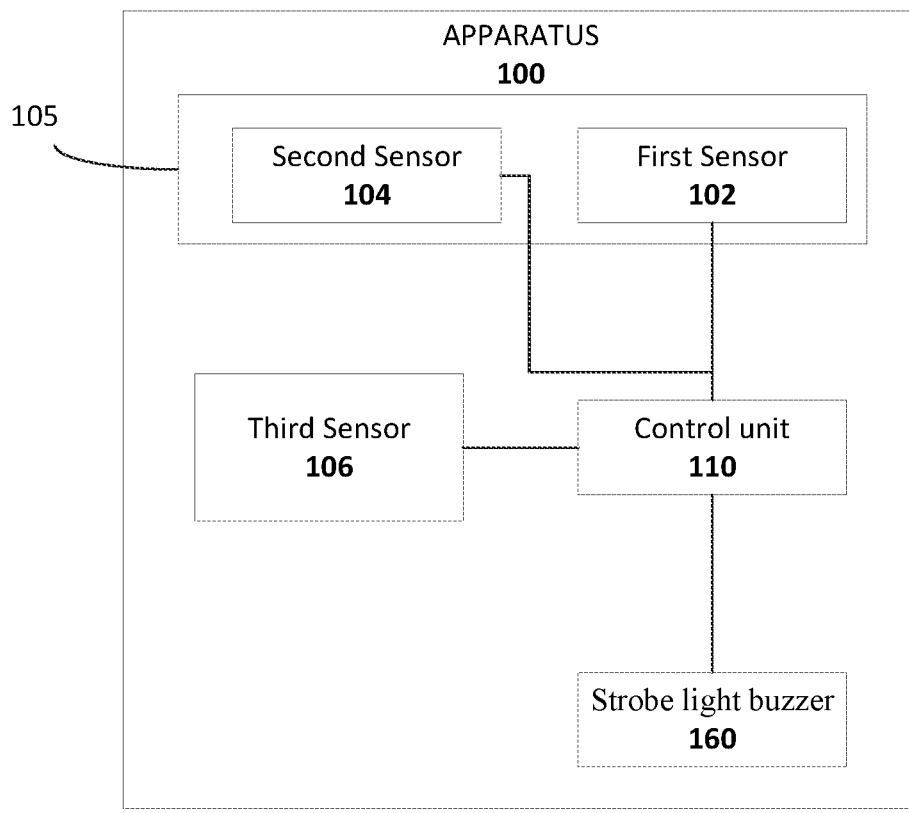
FIG. 3 is a block diagram showing components of the apparatus, according to an exemplary embodiment of the present invention

FIG. 3 shows an embodiment of the apparatus 100 having a first sensor 102, a second sensor 104, a third sensor 106, each connected to a control unit 110. The apparatus 100 further includes a strobe light buzzer 160 connected to the control unit 110. The first sensor 102 and the second sensor 104 can be deployed in an elongated hollow pipe 105, for example, a PVC pipe commonly used in construction. The elongated hollow pipe 105, as shown in FIG. 1, extend between the first level 150 and the second level 155 of the multi-level platform. The elongated hollow pipe 105 can have a proximal end and a distal end, the proximal end can be coupled to the second level 155 while the distal end can couple to the first level 150. The first sensor 102 can couple to the proximal end of the elongated hollow pipe 105, and the second sensor 104 can couple to the distal end of the elongated hollow pipe 105. An object can be dropped through the proximal end opening into the elongated hollow pipe 105, wherein the object descends within the elongated hollow pipe 105 and can exit from the distal end opening. The first sensor 102 can sense the entry of the object into the elongated hollow pipe 105, while the second sensor 104 can detect the exit of the object at the distal end opening.

In one implementation, the first sensor 102 can be a switched slide gate that can couple to the proximal end opening of the elongated hollow pipe 105. The object, such as a ball, when dropped into the elongated hollow pipe 105 through its proximal end opening pass-by the switched slide gate that results in a first signal. FIG. 1 shows the second person 140 drops the object 170 into the proximal end opening. The second sensor 104 can be a drop switch gate 120 that can couple to the distal end opening of the elongated hollow pipe 105. FIG. 1 shows the drop gate switch 120 coupled to the distal end opening of the elongated hollow pipe 105. The drop switch gate 120 is a momentum switch that includes a flap 180 (shown in FIG. 2), the flap 180 is pivotally coupled to a frame of the drop gate switch 120. For example, the flap 180 can couple with the frame using a magnet. The flap 180 can be switched between a close position and an open position, wherein the flap closes the distal end opening of the elongated hollow pipe 105 in the closed position. The flap 180 can switch to the open position by an object descending within the elongated hollow pipe 105 and hitting the flap 180 causing the opening of the flap 180. FIG. 1 shows the drop gate switch 120 in the closed position and the object 170 is being dropped from the proximal end opening of the elongated hollow pipe 105. In FIG. 2, the drop gate switch 120 is in the open position. The object 170 hits the flap 180 to open and the object exits from the elongated hollow pipe 105.

FIG. 1 further shows the first person sitting on a mat 130. The mat can be configured with the third sensor 106, such as the third sensor can detect the presence of a person on the mat 130. The mat 130 is placed on the first level 150 of the multilevel platform. The third sensor can be a pressure sensor such as it can detect a weight applied on top of the mat 130. Furthermore, FIGS. 1 and 2 also shows the strobe light buzzer 160 coupled to the multilevel platform.

In one implementation, the second person 140 drops the object 170 through the proximal end opening into the elongated hollow pipe 105, while the first person 165 is on the mat 130. The object 170 pass-by the first sensor 102 that triggers the first signal to the control unit 110. The control unit 110 includes a timing circuitry, wherein the control unit 110 can start the timing circuitry on receiving the first signal from the first sensor. While dropping the object 170, the second person can issue a command to the first person to move away from the mat 130. The command can be an audio command, such as "getaway". The audio command can be given directly or through a loudspeaker depending upon the distance between the second person and the first person. The object 170 descends within the elongated hollow pipe 105 till it reaches the second sensor 104. The second sensor detects the object 170 and sends a second signal to the control unit 110. On receiving the second signal from the second senor, the control unit can stop the timing circuitry and determine the fall duration of the object 170. The control unit 110 can further receive signals from the third sensor indicating whether the first person 165 is present on the mat 130 or not. The first person 165 should move from the mat on hearing the audio command from the second person. If the first person is still present on the mat 130, when the second signal is received from the second sensor, indicates that in a real situation if the object 170 has fallen on the first person, the object 170 would have hit the first person. Thus, the reaction time of the first person to the audio command was not good enough to avoid the fallen object and needs improvement. The control unit 110 can trigger the strobe light buzzer 160 to indicate that the fallen object 170 if fallen over the person would have hit the first person. The control unit 110 triggers the strobe light buzzer 160 when the person is still present on the mat while the fallen object hits the second sensor. The control unit 110 can also determine the time at which the first person moves away from the mat. The difference between the times of receiving the first signal and moving of the first person away from the mat may indicate the reaction time of the first person to the audio command by the second person. The length of the elongated hollow pipe 105 can be varied, for example, the elongated hollow pipe 105 can extend between the first level and third level of a multilevel platform. Similarly, the elongated hollow pipe 105 can be deployed between various levels of a multistory construction.

Figure 4:
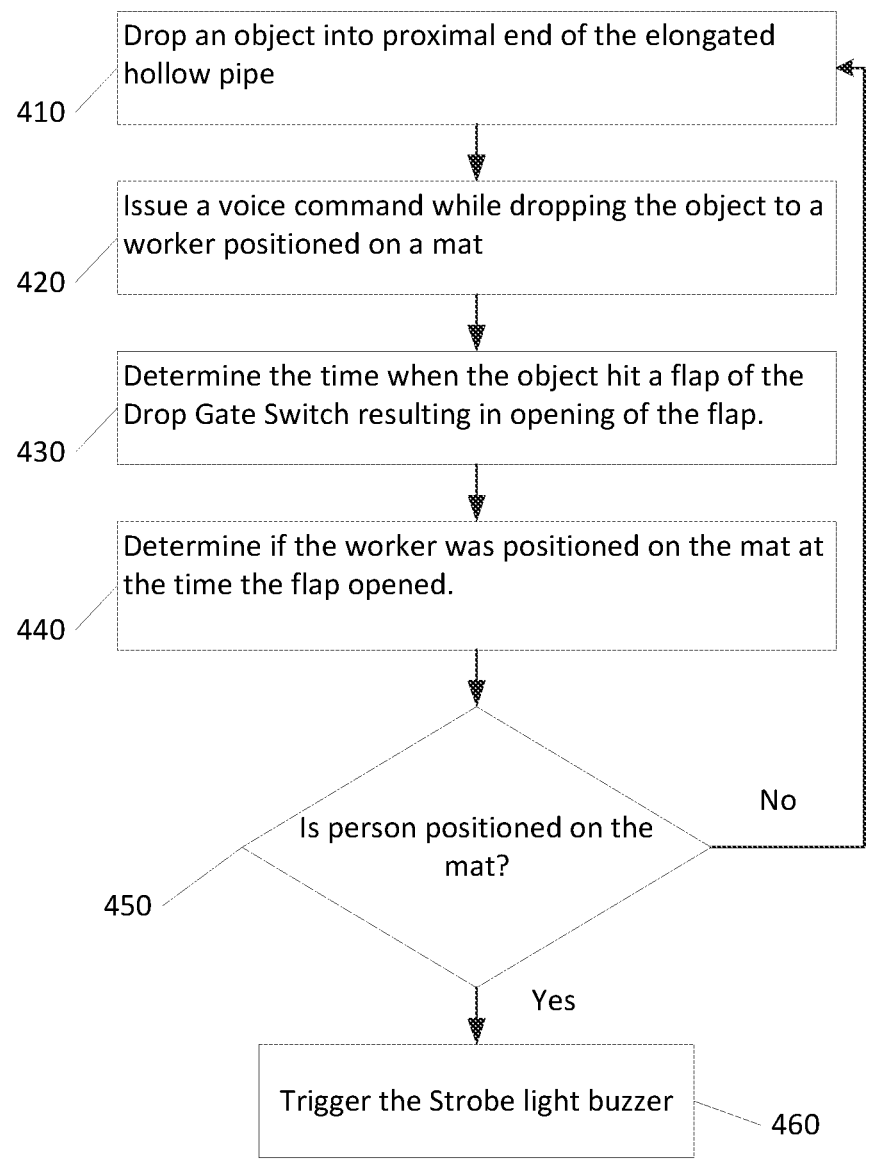
FIG. 4 is a flow chart showing method, according to an exemplary embodiment of the present invention.

FIG. 4 shows a method of demonstrating in a simulated reality of a person's reaction and response time to an object dropped from an elevated working platform even when the person is notified the moment the object is dropped. The object 170 can be dropped into proximal end opening of the elongated hollow pipe 105, at step 410. While dropping the object, a voice command, such as "getaway" can be issued to a worker positioned over the mat 130, at step 420. The object 170 hits the drop gate switch 120 positioned at the distal end opening of the elongated hollow pipe 105 causing the opening of the flap 180. Time at which the flap opens can be determined, at step 430. On the opening of the flap 180, the presence of the worker on the mat 130 can be determined, step 440. If the worker is present on the mat when the flap opened can be checked, at step 450. If the worker is still present on the mat while the flap opened, the strobe light buzzer 160 can be triggered, at step 460. Otherwise, if the worker moved away from the mat before the flap open, the above process can be repeated a few more time.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An apparatus comprising:
   an elongated hollow pipe having a proximal end and a distal end, the proximal end having a proximal end opening, the distal end having a distal end opening;
   a second sensor coupled to the distal end of the elongated hollow pipe, the second sensor configured to detect an object descending within the elongated hollow pipe and reach the second sensor;
   a mat having a third sensor, the third sensor configured to detect a presence of a person on the mat;
   an alarm; and
   a control unit electrically connected to the second sensor, the third sensor, and the alarm, wherein the control unit is configured to:
   receive a second signal from the second sensor, the second signal indicating the object reach the second sensor,
   determine the presence of the person over the mat when the control unit receives the second signal, and
   trigger the alarm in response to the presence of the person.

2. The apparatus of claim 1, wherein the apparatus further comprises a first sensor coupled to the proximal end of the elongated hollow pipe, the first sensor configured to detect the object pass-by the first sensor, the first sensor electrically connected to the control unit, wherein the control unit is further configured to:
   receive a first signal from the first sensor, the first signal indicating the object pass-by the first sensor, and
   determine a duration between the receiving of the second signal and the first signal.

3. The apparatus of claim 1, wherein the second sensor is a drop gate switch, the drop gate switch comprising a frame coupled to the distal end opening of the elongated hollow pipe, a flap pivotally coupled to the frame, the flap switchable between an open position and a closed position, the flap configured to switch from the closed position to the open position by the object descending within the elongated hollow pipe and hitting the flap, the opening of the flap results in the second signal.

4. The apparatus of claim 1, wherein the third sensor is a pressure sensor.

5. The apparatus of claim 1, wherein the alarm is a strobe light buzzer.

6. An apparatus comprising:
   an elongated hollow pipe having a proximal end and a distal end, the proximal end having a proximal end opening, the distal end having a distal end opening, the proximal end coupled to a second level of a multilevel platform, the distal end coupled to a first level of the multilevel platform, wherein the second level is above the first level;
   a second sensor coupled to the distal end of the elongated hollow pipe, the second sensor configured to detect an object received from the proximal end opening and descending within the elongated hollow pipe and reach the second sensor;

a mat having a third sensor, the mat positioned at the first level, the third sensor configured to detect a presence of a person on the mat;

an alarm; and a control unit electrically connected to the second sensor, the third sensor, and the alarm, wherein the control unit is configured to:

receive a second signal from the second sensor, the second signal indicating that the object reaches the second sensor, determine the presence of the person on the mat when the control unit receives the second signal, and triggering the alarm in response to the presence of the person.

7. The apparatus of claim 6, wherein the apparatus further comprises a first sensor coupled to the proximal end of the elongated hollow pipe, the first sensor configured to detect the object pass-by the first sensor, the first sensor electrically connected to the control unit, wherein the control unit is further configured to:

receive a first signal from the first sensor, the first signal indicating the object-pass by the first sensor, determine a duration between receiving of the second signal and the first signal.

8. The apparatus of claim 6, wherein the second sensor is a drop gate switch, the drop gate switch comprising a frame coupled to the distal end opening of the elongated hollow pipe, a flap pivotally coupled to the frame, the flap switchable between an open position and a closed position, the flap configured to switch from the closed position to the open position by the object descending within the elongated hollow pipe and hitting the flap, the opening of the flap results in the second signal.

9. The apparatus of claim 1, wherein the third sensor is a pressure sensor.

10. The apparatus of claim 1, wherein the alarm is a strobe light buzzer.

11. A method of demonstrating in a simulated reality of a person's reaction and response time to an object dropped from an elevated working platform even when the person is notified the moment the object is dropped, the method comprising:

providing an apparatus, the apparatus comprising:

an elongated hollow pipe having a proximal end and a distal end, the proximal end having a proximal end opening, the distal end having a distal end opening, the proximal end coupled to a second level of a multilevel platform, the distal end coupled to a first level of the multilevel platform, wherein the second level is above the first level;

a second sensor coupled to the distal end of the elongated hollow pipe, the second sensor configured to detect an object received from the proximal end opening and descending within the elongated hollow pipe and reach the second sensor;

a mat having a third sensor, the mat positioned at the first level, the third sensor configured to detect presence of a person on the mat;

an alarm; and a control unit electrically connected to the second sensor, the third sensor, and the alarm, wherein the control unit is configured to:

receive a second signal from the second sensor, the second signal indicating that the object reaches the second sensor, determine presence of the person over the mat when the control unit receives the second signal, and triggering the alarm in response to the presence of the person;

dropping the object through the proximal end opening into the elongated hollow pipe; and issuing an audio command for the person on the mat to move away from the mat.

12. The method of claim 11, wherein the apparatus further comprises a first sensor coupled to the proximal end of the elongated hollow pipe, the first sensor configured to detect the object pass-by the first sensor, the first sensor electrically connected to the control unit, wherein the control unit is further configured to:

receive a first signal from the first sensor, the first signal indicating the object pass-by the first sensor, and determine a duration between receiving of the second signal and the first signal.

13. The method of claim 11, wherein the second sensor is a drop gate switch, the drop gate switch comprising a frame coupled to the distal end opening of the elongated hollow pipe, a flap pivotally coupled to the frame, the flap switchable between an open position and a closed position, the flap configured to switch from the closed position to the open position by the object descending within the elongated hollow pipe and hitting the flap, the opening of the flap results in the second signal.

14. The method of claim 11, wherein the third sensor is a pressure sensor.

15. The method of claim 11, wherein the alarm is a strobe light buzzer.

16. The method of claim 11, wherein the method further comprises:

receiving, by the control unit, the second signal;

determining, by the control unit, the presence of the person on the mat when the second signal is received; and triggering the alarm in response to the presence of the person.

* * * * *